United States Patent [19]

Handley

[11] 3,730,135
[45] May 1, 1973

[54] EXTRUDING CIRCULAR LAYERS
[75] Inventor: John Handley, Isleworth, England
[73] Assignee: United Biscuits Limited, Isleworth, Middlesex, England
[22] Filed: July 20, 1970
[21] Appl. No.: 56,422

[52] U.S. Cl................................118/16, 118/25
[51] Int. Cl....................................B05c 5/00
[58] Field of Search.....................118/25, 7, 24, 16; 18/12 DR, 12 DS, 12 DM

[56] References Cited

UNITED STATES PATENTS 1,859,971   5/1932   Keck.................................118/24 X
2,567,704   9/1951   Grimes..............................18/12 DR
3,473,508   10/1969  Stewart et al......................118/25 X Primary Examiner—John P. McIntosh
Attorney—Darbo, Robertson & Vandenburgh

[57] ABSTRACT

A cake making machine slices the cake into layers, separates the layers, extrudes a filling onto the lower layer and replaces the upper layer. The extruder is a head which rotates about an axis which is normal to the demarkation plane between the layers. Its orifice is a slot extending outwardly from the axis of rotation of the extrusion head. The width of the slot varies along its length so that the thickness of the layer, extruded through the slot during the rotation of the head, is constant.

2 Claims, 11 Drawing Figures

Patented May 1, 1973

INVENTOR:

JOHN HANDLEY

BY *Darbo, Robertson & Vandenburgh*

Patented May 1, 1973

INVENTOR:
JOHN HANDLEY
BY
*Darbo, Robertson &
Vandenburgh*

EXTRUDING CIRCULAR LAYERS

This invention relates to means for extruding extrudable materials into circular layers and to machines incorporating said extruding means.

While its primary object is to provide fillings for cream buns, the techniques employed are applicable to extrusion requirements for other purposes.

The main aspect of the invention comprises extruding equipment for depositing a circular disc of extrudable material between walls defining a slot in an extruder head on to a flat surface by relatively rotating the slot and the flat surface about an axis at one end of the slot, wherein the width of the slot varies along its length and the width of the slot at points along its length varies through the slot from entrance to exit so that the combined effect is to give a substantial uniplanar surface to the extruded disc.

The invention will be described with reference to an embodiment shown in the accompanying drawings, in which:

FIG. 5 shows the bun slicing equipment, while

Figure 1:
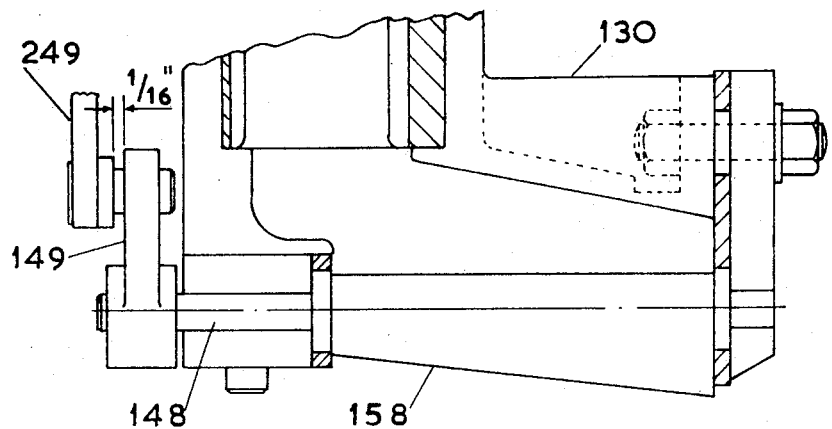
FIG. 1 shows an extruder head in sectional elevation.

The machine shown is for the manufacture of round harlequin cream cakes of substantial diameter, about 2 1/2 inches, comprising a single layer of cream between cake layers of different colors.

Self colored cakes are made from mixtures of two different colors; yellow and pink. The machine to be described comprises the following stages;

1. Cakes of the two different colors are fed alternately along a continuously moving conveyor by known means.

2. The cakes are sliced into top and bottom halves by a transverse horizontal saw reciprocated at high speed which slices through each cake in turn as it is carried along by the conveyor.

3. The split cakes are held at the exit end of the continuous conveyor by a gate device operated from the main cam shaft in accordance with the overall timing cycle, and are released in turn on to a step-by-step conveyor between successive crossbars.

4. A swing arm next picks up the top half of each cake, and swings it round to deposit it on a preceding bottom half cake which has been creamed.

The relative spacing of the cakes and the length of the arm are such that each top half will be deposited on the third bottom half preceding its own bottom half, so that; alternate cakes being of different colors; each top half is deposited on a bottom half of a different color.

The above spacing leaves two intermediate cake positions on the conveyor available between the removal and replacement operations. The following operations (5) and (6) take place in these positions.

5. The color of the bottom half is photo-electrically checked.

6. The bottom half is creamed.

7. The transfer arm places the top half carried thereby on the creamed bottom half.

8. The finished cake passes from the step-by-step conveyor to an inspection position, for example.

The timing cycle is governed by the creaming operation which is the major function of the machine.

Because the cakes are circular, and in addition are of relatively large diameter, the cream is applied as a ribbon, the width of which is about the radius of the cake, in a circular motion about the center of the cake. The thickness of the ribbon increases from the center of rotation to the periphery in a V-formation so as to give an even covering over the whole of the cake surface.

The nozzle has one side pivoted for opening and closing the nozzle cleanly and quickly.

The cream is extruded under pressure, and there is a continuously moving supply column of cream from the cream reservoir while extrusion is taking place.

It would take an appreciable time period either to put this column into motion, or to stop it. In order to get a clean start and finish to the extrusions on to the cakes, the cream supply movement must be continuous. It is proposed to facilitate this requirement by switching the pressurized supply in a continuous sequence to a plurality of outlets, which can be a single nozzle and a bypass return channel to the reservoir; or a plurality of nozzles, one to each of a plurality of parallel process lines in which the respective extrusions occur sequentially.

In the machine shown, the supply valves for the cream nozzles of two process lines are 180° out of phase, one opening as the other closes, and vice versa.

Figure 3:
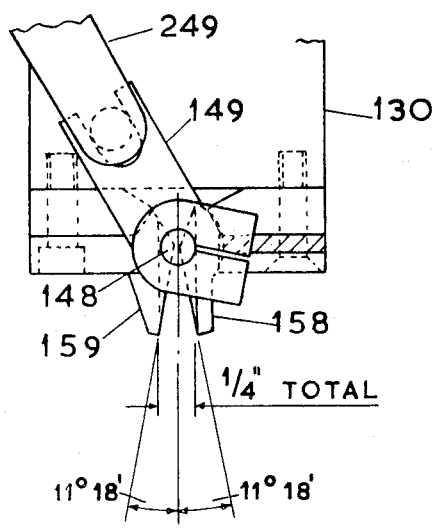
FIG. 3 show the extruder head of FIG. 1 in vertical section at right angles to FIG. 1.
Figure 2:
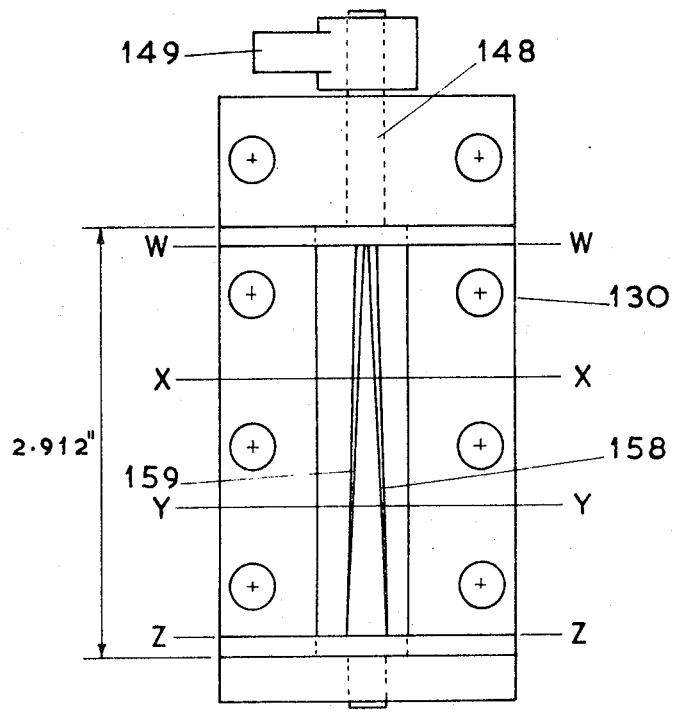
FIG. 2 shows the exit end of the extrusion head in plan.

The nozzle construction shown in FIGS. 2, 3 is designed for switching between nozzles in parallel process lines, and for cam operation.

The end of the pipe carries a rotatable cantilever nozzle which is rectangular in plan and the base of which consists of fixed and movable sides of the nozzle, which diverge radially so as to form a substantially V-shaped opening. As shown in FIGS. 2A—D the opposed surfaces of the nozzle sides are built up in a manner designed to control the rate of flow according to experiment to give an even spread of cream on the cake as described below.

The movable nozzle member is oscillable on a horizontal pivot.

The lips of the fixed and movable nozzle members are designed to give a sharp opening and closure.

The rotation of the nozzle will be described in the following description of the machine and its operating cycle.

Figure 4A:
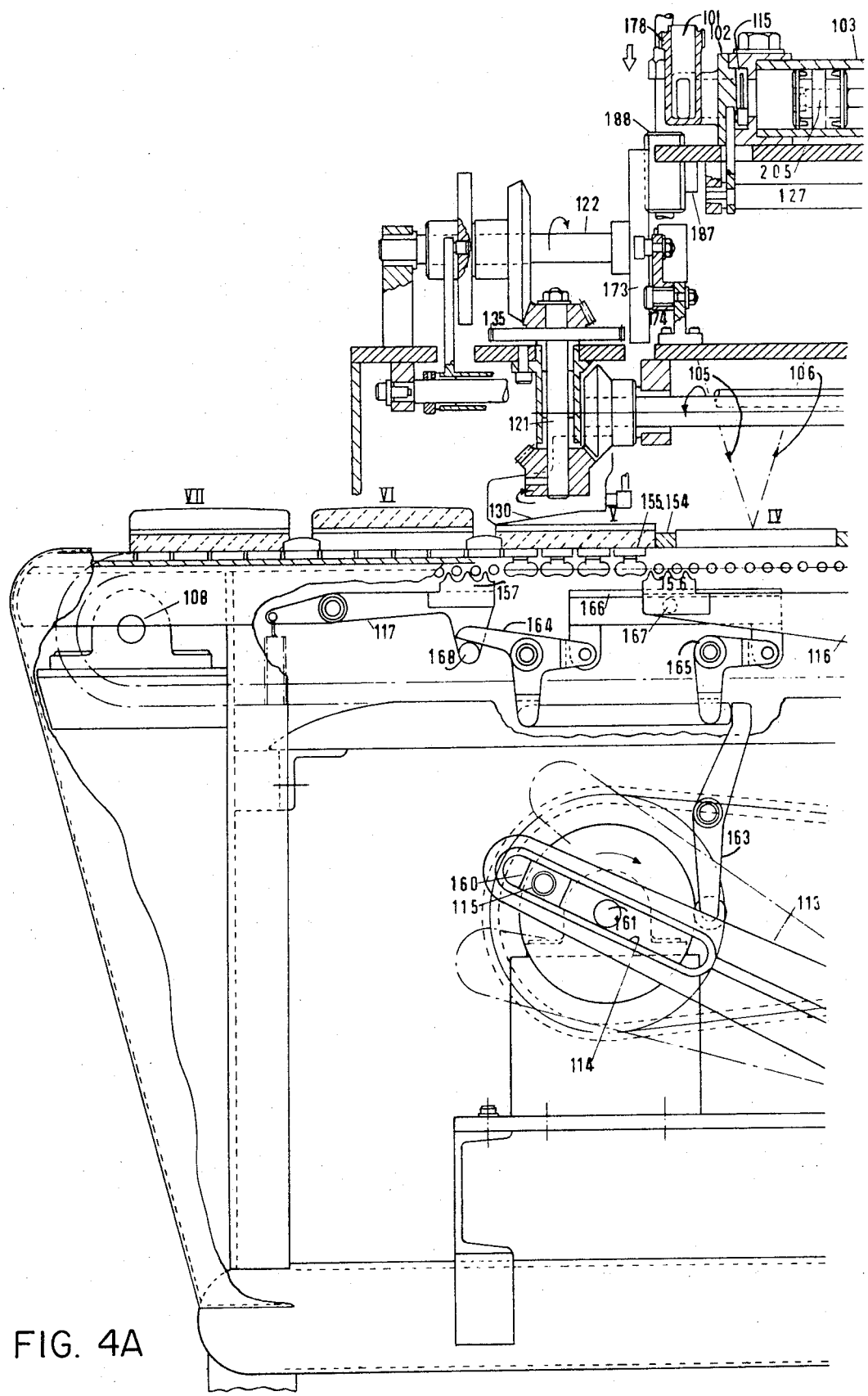
FIGS. 4A and 4B are a longitudinal elevation partly in section of a cream bun machine incorporating the extruder head of FIGS. 1–3.
Figure 4B:
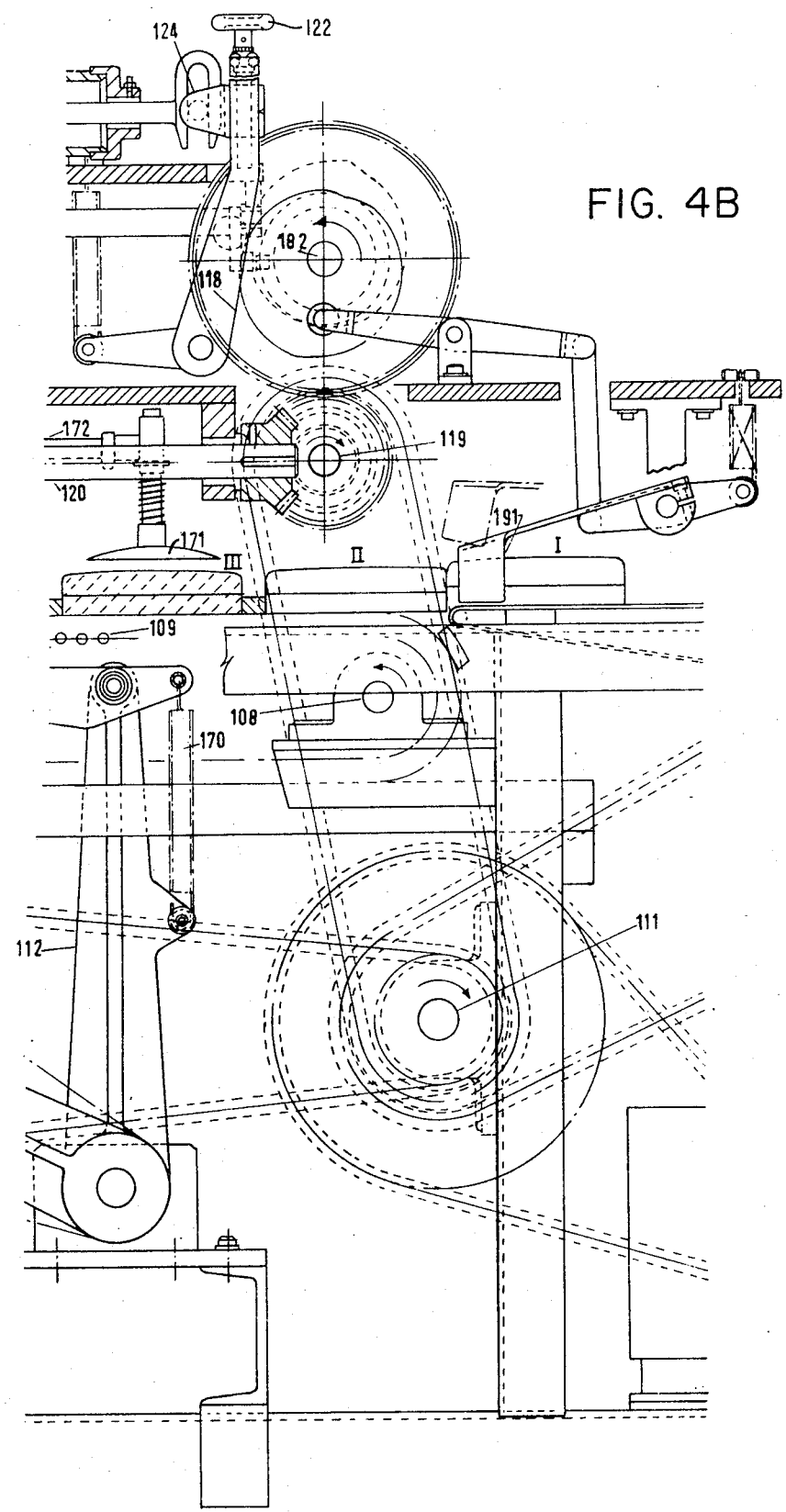
Figure 5:
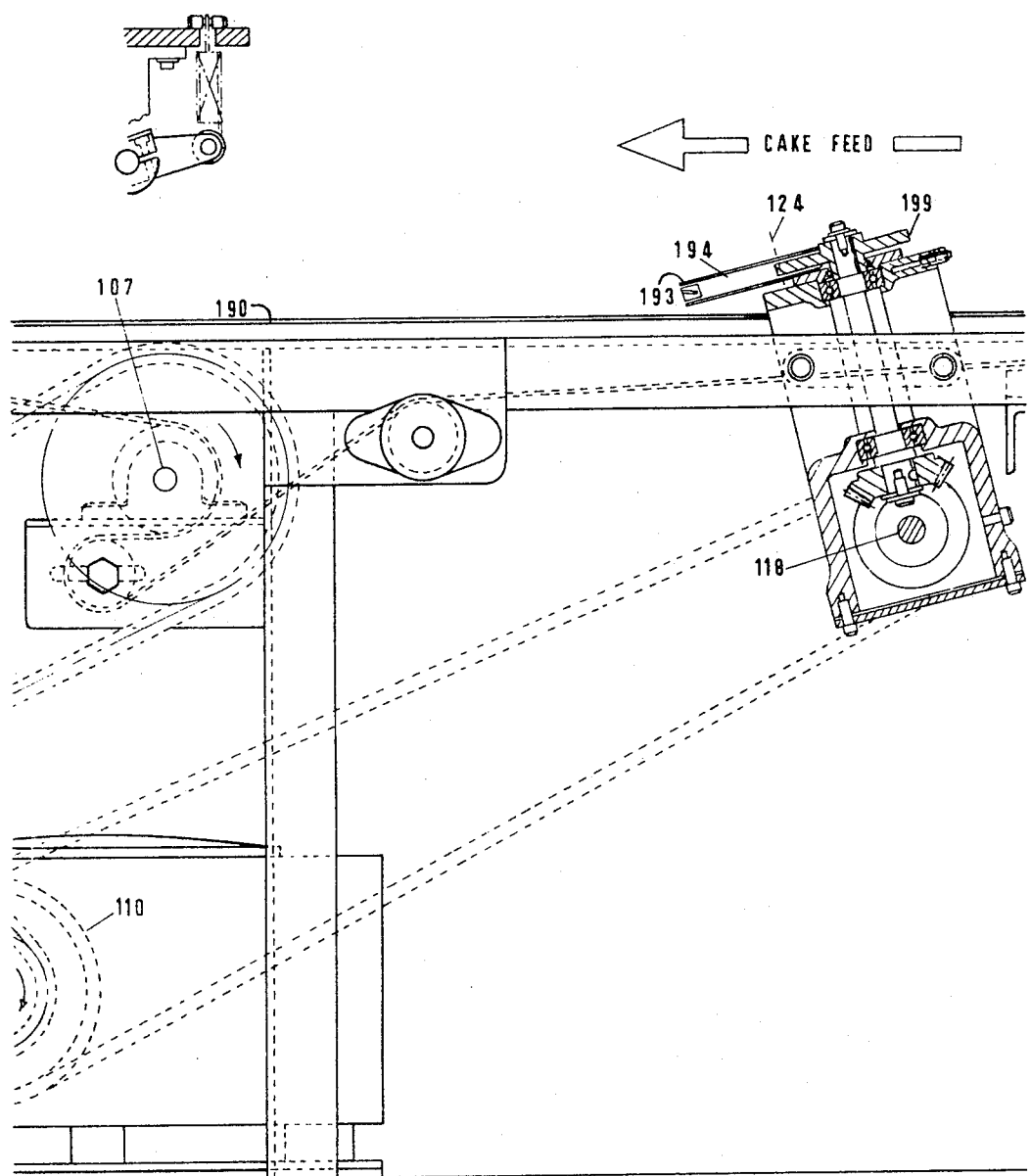

In FIGS. 4 and 5 a gear box 110 drives a saw drive-shaft 118, and a layshaft 111 which in turn drives the drive shaft 107 of the cake feed conveyor 190; a second layshaft 119 geared to a main cam-shaft 182; a second cam-shaft 122 through bevel-gearing at each end of shafts 120; 121; and the shaft 161 of Whitworth Motions for operating the step-by-step indexing conveyors 108, 109, 155 of the two process lines.

The cam on shafts 182, and 122 and the Whitworth Motion and its associated linkages are timed to create an operational cycle the individual operations of which are described below.

The saw mechanism is independent of the timing cycle, and comprises a fret-saw 193 which forms one of the parallel long legs on a rectangular linkage, each short leg 194 of which is centrally pivoted as at 124, and one of which acts as follower to a cam disc 199 driven from shaft 118. The periphery of the cam disc is of sine-wave form so as to oscillate the linkage and reciprocate the saw at high speed, whereby the saw cuts through each cake as it is presented thereto by the conveyor without the cake being held.

The conveyor 190 continuously driven by its drive shaft 107 feeds the sliced cakes, the leading cake being held against spaced inclined stops on a pivoted gate 191 operated from a cam on shaft 182 to raise and lower the gate 191, so as to allow each cake in turn to be fed from conveyor 190 between adjacent cross bars 154 on the indexing conveyor.

Figure 6:
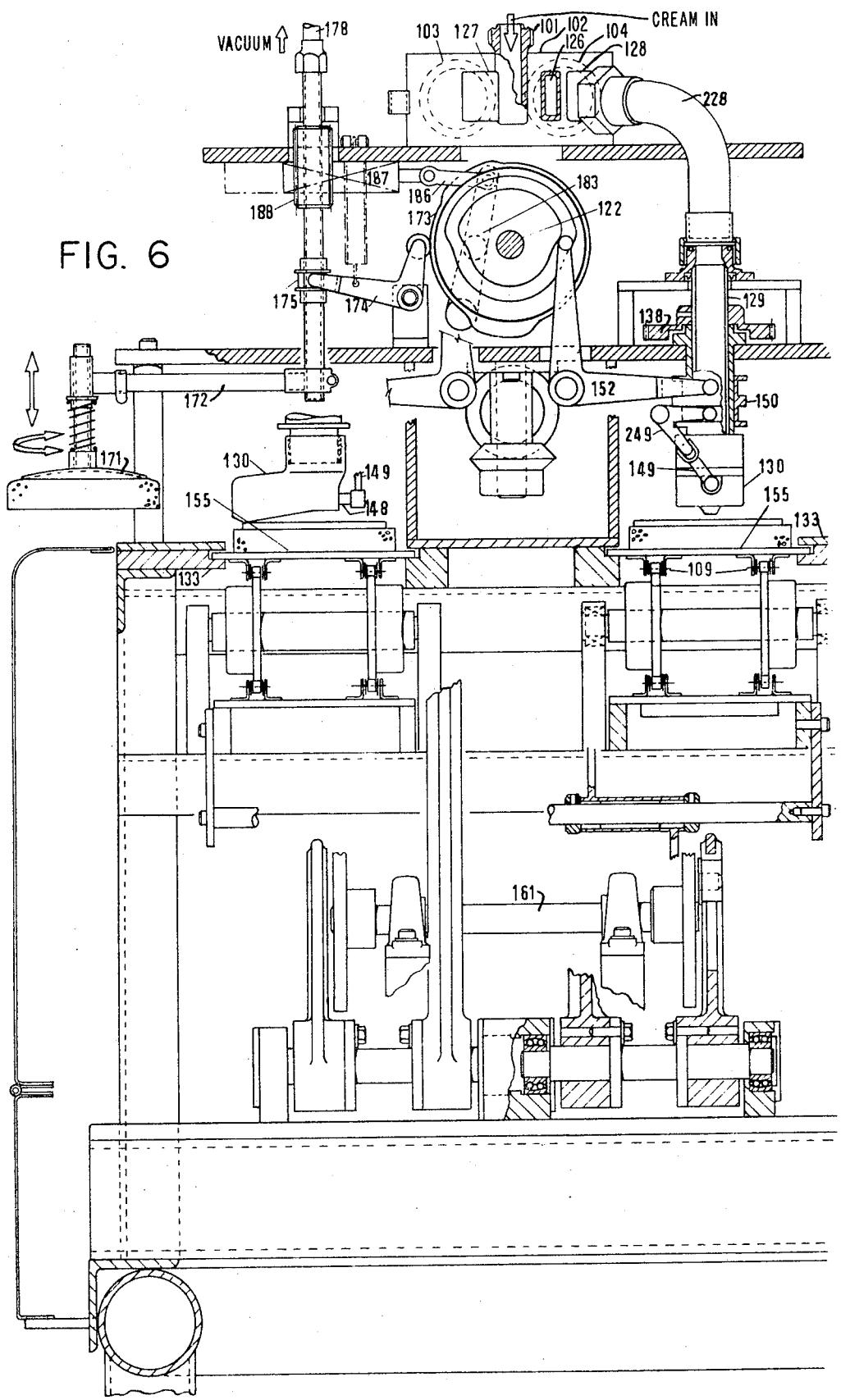
FIG. 6 shows an end elevation of the machine shown in FIG. 4 partly in section.

The indexing conveyor consists of an endless pair of bicycle-type chains 109 carrying slats 155, the ends of which run in guides 133, FIG. 6. The cross-bars 154 are carried on the slats 155 at intervals determined by the size of the cakes.

The conveyor is indexed forward by successive steps equal in length to the spacing between cross-bar centers and locked in position between steps in the following manner.

Shaft 161 driven continuously from layshaft 111 carries spaced crank discs carrying crank pins 115 engaging in slots 114 in the arms 113 of associated two-armed levers, the other arms 112 of which pivotally carry spring-controlled supports 116 for toothed sprags 156 pivoted at 167 and adapted to engage the conveyor chains 109 as shown. The supports 116 engage under respective horizontal guides 166, the ends of both of which are carried respectively on linked bell-cranks 164, 165. Two-armed cam follower levers 163 oscillate the bell-cranks on fixed pivots from rotary cams on shaft 161.

Third legs on bell-cranks 164 act on pins or rollers 168 on spring-controlled pivoted supports 117, similar to supports 116, and carrying locking sprags 157 also adapted to engage the conveyor chains.

When a row of cakes are to be processed, the Whitworth Motion 160–166 is so positioned that the bell-cranks have been rotated clockwise to allow the sprags 157 to engage the conveyor chains and lock them in position, while the guides 166 have been lowered withdrawing the sprags 156 from the chains.

While the cakes are processed, the crank pins 115 rotate levers 113, 112 clockwise to move the supports 116 and sprags 156 to the right in readiness for the next conveyor indexing operation.

Further rotation of shaft 161 allows lever 163 to rotate clockwise and the bell-cranks 164, 165 rotate anti-clockwise to withdraw the sprages 157; and to raise supports 166 under the pressure of springs 170 on the levers 116 whereby the sprags 156 engage the chains.

The crank levers 112, 113 are next rotated anti-clockwise and the sprags 156 feed the conveyor chain by the indexing distance between two cross-bars 154.

The conveyor indexing movements described above cover a complete cycle of cake processing operations which will now be described.

When the conveyor becomes stationary after indexing, the suction cup 171 is lowered on to the sliced cake which has arrived thereunder. Cup 171 is shown in FIG. 4 over a cake, while in FIG. 6 it is shown rotated by 90° and at right angles to the conveyor. The cup is on the lower end of a pneumatic vacuum tube carried vertically under spring control in the end of a horizontal tube 172 fixed on the bottom end of a vertical tube 178 journalled for rotational and translational movements. As seen in end elevation, the tube 178 carries a coupling spool 175 engaged by a roller on a bell-crank lever 174 operated by a peripheral cam on shaft 122 for raising and lowering the pneumatic assembly 178, 172, 171.

The tube 178 also carries a splined cylinder 188 in gear with a horizontal rack 187 journalled for linear movement and connected by a link 186 to a cam follower lever 183.

The tube 178 is connected via a control valve, not shown, to a suction pump. The control valve is controlled by a cam on shaft 182 in conventional manner, its timing being related to the sequence of operation of the suction cup 171 under control of movements 174, 175 and 187, 188, as follows:

A. Cup 171 lowered on to cake in position III, FIG. 14.

B. Suction applied.

C. Cup raised to original position shown in position III, FIGS. 4–6 with top half of cake.

D. Cup rotated on axis of tube 78 through 180°.

E. Cup lowered to place top half cake carried thereby on to creamed bottom half of different color already in position VI.

F. Suction removed.

G. Cup raised.

H. Cup rotated back to original position above cake position III.

At cake position IV, a color check is to made on the bottom half cakes arriving thereat, for pink and yellow alternately. As equipment for this purpose is well-known and forms no part of the invention as such, it is indicated by incident and reflected light beams 105, 106.

At position V, the bottom half-cakes are creamed by the creaming head 130. The movement of the creaming head required to cream a cake is a 360° rotation during which a radial ribbon of cream, the thickness of which increases from the center to the periphery, is laid upon the cake to give uniform coverage over the circular area of the cake.

The timing cycle is such that the conveyor stepping time and the processing time are equal, and the creaming heads (one in each processing line are both continuously rotated: since the processing files are 180° out of phase, the creaming heads will cream alternately, each rotating idly while the other creams. The cream supplies to the two creaming heads therefore operate in turn,, with a trigger change-over of the cream supply from one head to the other without interference with the rate of flow of the cream, which is continuous.

The cream supplies are drawn from a cream reservoir (not shown), the outlet from which is connected to the common inlet 101 which is connected via side tubes 127 to inlet ports 126 in the end plate 102 of the dual cream-pump assembly 103, 104. The front plate 102 also has outlets 128 separately connected by pipes 228 and rotatably-journalled tubes 129 to the respective creaming heads 130. The creaming heads are carried by the tubes 129 and are rotated from gear-wheel 135, FIG. 4, via an intermediate gear (not shown) and gear wheel 138, FIG. 6, per head.

A slide valve 115 is slidably mounted parallel to and adjacent front plate 102 and has ports arranged to be aligned alternately with the inlet port for one pump chamber 103 or 104 and the outlet port for the other pump chamber 104 or 103, so that while each pump is filling in turn, the other is expelling.

The rods of the pump pistons 205 have pin-and-slot connections with sliders 124 on cam-follower levers 118, operated by 180° out-of-phase cams on shaft 182. Each slider 124 carries a toothed rack engaging a rotatable screw rod 122 journalled in the respective cam follower lever 118 so that the slider can be adjusted to move its pin up and down the slotted piston rod and so vary the piston stroke.

The 180° out-of-phase cams cause the pistons to work in opposite directions so that while either cylinder 103, 104 is filling, the other is expelling its contents, whereby the creaming heads cream the cakes thereunder alternately.

The creamer nozzles are opened and closed under control of cam-operated levers 152 the operating arms of which carry rollers engaging in the upper of two annular grooves in sleeves 150 rotatably and axially movable on the creamer tubes 129.

Sleeve levers 249 carry rollers engaging the lower grooves in said sleeves 150 and are pivotally connected to crank arms 149 on the spindles of the pivoted halves of the creamer nozzles, so as to open and close the nozzles in correct time relation to the operation of the cream feed pumps.

Each creamed bottom-half cake is indexed from position V to position VI; receives a top-half in position VI; is indexed to position VII, from which it is indexed on to an output conveyor or other reception device.

The important thing in the design of the rotary slot extruder is to deposit a substantially uniplanar disc of extruded material.

There tends to be a central hump; a thinning out towards the periphery; and a radial ridge at the finishing line.

Three factors have been found important. Firstly, it is obviously necessary to grade the rate of extrusion from a minimum near the center to a maximum at the periphery, but this is not a linear grading and it is difficult to reduce the flow near the center to the extent required.

It is not possible to restrict the central flow to the extent necessary and a further expedient has been introduced which is to make the slot walls diverge from entrance to exit as well as radially. By this means the rate of flow at the exit from the slot at any point can be made smaller than the input rate of flow, and the percentage reduction of flow can be graded by varying the divergence of walls in the direction parallel to the axis of rotation from point to point along the slot. The maximum divergence is at the inner end of the extrusion slot but again the variation in divergence is not linear along the axis of the slot, and great care in design is necessary to obtain the best results.

FIGS. 2 and 2A – 2D show the preferred slot structure. FIG. 2 is a plan view of the extrusion head showing the radial slot between two radially diverging walls 158, 159.

The lines W—W, X—X, Y—Y, and Z—Z in FIG. 2 indicate the vertical planes of the sections shown in FIGS. 2A, 2B, 2C and 2D respectively. These sections show the vertical profiles of the walls 158, 159 of the extrusion slot which change continually along the radial length of the slot from a point near the axis of rotation of the extrusion head to the outer end of the slot. The passage through the slot at W—W is similar in cross-sectional shape to a Venturi tube, converging downwards to a central narrow passage from which the slot diverges to its outlet end.

Figure 2A:
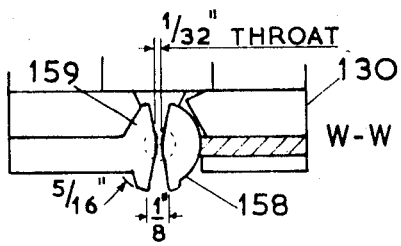
FIGS. 2A–2D show four sections of the extrusion slot in FIG. 2 on W—W;-ZZ
Figure 2B:
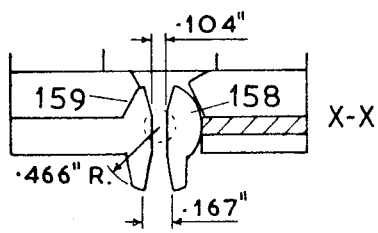
Figure 2C:
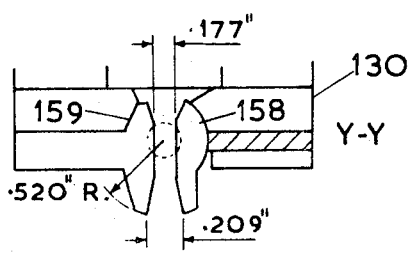
Figure 2D:
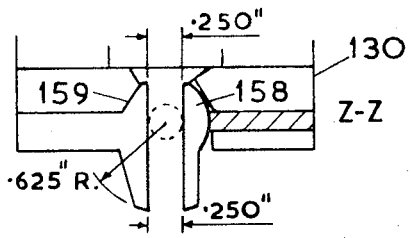

Moving along the slot from W—W to X—Y and then to Y—Y; that is, from FIG. 2A to FIG. 2B and then to FIG. 2C; the central constricted part of the slot widens and lengthens, while the ends shorten, until at the radially outer end, illustrated in FIG. 2D, there are parallel side walls creating an open passage in which there is only friction to interfere with the free passage of filling, at the position at which the maximum deposit is required on the peripheral part of the biscuit.

Thus the rate of extrusion through the slot is controlled so as to be a minimum at the center and to increase therefrom along the slot to a maximum at the outer end.

Broadly speaking, the vertical height of the central portion of the slot increases from its radially inner end to its radially outer end, while the profile of the slot in the direction of flow changes in a manner designed to be complementary to the gradual increase in height of the central portion of the slot from the inner end to the outer end so as to create a uniform deposit of filling over the whole of a round biscuit.

The precise changes in profile within the general three-dimensional parameters set out above are a matter for experiment in relation to the consistency of the filling to be used, the speed of operation, etc.

The wall 159 of the slot is fixed in position.

The other wall 158 of the slot is slung between brackets carried by end studs rotatably mounted in the extruder head 130, which is in the form of a foot on the leg 129, FIG. 6. The end stud 148, FIG. 1 is extended and has fixed thereto the oscillator arm 149 pivotally connected to the operating lever 249, FIG. 6. The back of wall 158 is curved to roll on shallow conclave. containing wall of the head.

The extruder inlet and exit dimensions from FIG. 2A to FIG. 2D show the preferred dimensions at W,X,Y, and Z and indicate the intricacy of the problem, the relation between the entrance and exit widths through the slot varying from 1: 4 to 1: 1; and the exit width having a range of 1: 3 from center to periphery.

The walls of the extruder slot are so designed that the exit lips, i.e. the bottoms of the members 158 and 159 as seen in FIGS. 2A–2D, make a sharp line contact when the valve is closed and thus give a precise closure.

Of course, the cakes could be rotated under a stationary extruder arm, or relative rotation obtained in other ways. Again, it may be that a compartmented slot could be used instead of an open slot.

It may be that variation in one of the forms of divergence can vary the requirement from the other form of divergence.

What we claim is:

1. In an extruding equipment wherein an extruding means moves an extrudable material onto the flat surface of an article, the improvement comprising:

said extruding means including a supply means for feeding the extrudable material at a constant rate of feed, a plurality of extruder heads, and automatic control means connected between said supply means and said heads for controlling the flow of material to the heads in staggered time relation so that the extruding operations of the heads continuously succeed one another in an unbroken repetitive sequence;

each of said heads comprising nozzle means on said head extending outwardly from a rotating axis, means to rotate said nozzle means, said nozzle means including walls having at least portions relatively close together to define a slot extending outwardly along a line in one direction only from said axis and through which the material is extruded in the form of a continuous ribbon of a width, as measured transverse to said line, which increases in relation to the distance from the axis to the outer end of the slot which ribbon, because of the rotation, forms a circular disc on said article, said nozzle means being profiled both along the length of the slot and through the depth of the slot such that the combined result is to effect a substantially uniplanar surface to said disc of extruded material, the distance between the walls that define the slot, as measured transverse to said line, increasing between the axis end of the slot and the other end of the slot and in some areas the walls diverging below said portions with the amount of divergence decreasing between the axis end of the slot and the other end of the slot, one of the walls defining the extrusion slot being longitudinally pivoted; and automatic control means for operating said pivoted wall for opening and closing said slot.

2. Extruding equipment as claimed in claim 1 wherein said supply means comprises a piston pump operated from a uniform velocity cam via a cam lever of adjustable length.

* * * * *